United States Patent [19]

Futamoto et al.

[11] Patent Number: 5,073,460
[45] Date of Patent: Dec. 17, 1991

[54] MAGNETIC RECORDING MEDIUM AND PROCESS FOR PRODUCING THE SAME

[75] Inventors: Masaaki Futamoto, Kanagawa; Yukio Honda, Fuchu; Seiichi Asada, Kyoto; Takashi Nishimura, Kokubunji; Kazuetsu Yoshida, Kodaira; Heigo Ishihara, Tokyo, all of Japan

[73] Assignees: Hitachi, Ltd., Tokyo; Hitachi Maxell, Ltd., Osaka, both of Japan

[21] Appl. No.: 584,363

[22] Filed: Sep. 18, 1990

Related U.S. Application Data

[63] Continuation of Ser. No. 149,142, Jan. 27, 1988, abandoned, which is a continuation of Ser. No. 789,824, October 21, 1985, abandoned.

[30] Foreign Application Priority Data

Oct. 22, 1984 [JP] Japan ................. 59-221688
Mar. 20, 1985 [JP] Japan ................. 60-54419

[51] Int. Cl.$^5$ ................. G11B 5/66; G32B 9/00
[52] U.S. Cl. ................. 428/694; 428/688; 428/704; 428/900; 427/130
[58] Field of Search ........... 428/704, 694, 900, 688; 365/122; 369/13; 427/130

[56] References Cited

U.S. PATENT DOCUMENTS

| | | | |
|---|---|---|---|
| 4,411,963 | 10/1983 | Aine | 428/622 |
| 4,489,139 | 12/1984 | Ohta et al. | 428/621 |
| 4,565,734 | 1/1986 | Arai et al. | 428/695 |
| 4,661,420 | 4/1987 | Nakamura et al. | 428/694 |

FOREIGN PATENT DOCUMENTS

| | | |
|---|---|---|
| 0119536 | 5/1939 | Japan . |
| 21901 | 2/1978 | Japan . |
| 74844 | 6/1981 | Japan . |
| 19739 | 2/1983 | Japan . |
| 164030 | 9/1983 | Japan . |
| 179939 | 10/1983 | Japan . |

OTHER PUBLICATIONS

Aromo et al., IBM TDB, vol. 16, No. 5, Oct. 1973, p. 1442.

Primary Examiner—Cashion, Jr.: Merrell C.
Assistant Examiner—Dennis Carmen
Attorney, Agent, or Firm—Antonelli, Terry, Stout & Kraus

[57] ABSTRACT

A magnetic recording medium comprising a substrate, a ferromagnetic thin film formed on the substrate, and a protective film formed directly on the ferromagnetic think film, and a process for producing such magnetic recording medium. The expression "formed directly" refers to the technique for forming the protective film on the ferromagnetic thin film so that the interface therebetween is free from contamination by, for instance, conducting the protective film formation under the vacuum used when forming the ferromagnetic thin film.

37 Claims, 1 Drawing Sheet

MAGNETIC RECORDING MEDIUM AND PROCESS FOR PRODUCING THE SAME

This application is a continuation of application Ser. No. 07/149,142, Jan. 27, 1988, now abandoned, which is a continuation of Ser. No. 06/789,824, filed Oct. 21, 1985, now abandoned.

BACKGROUND OF THE INVENTION

This invention relates to a magnetic recording medium and a process for producing the same. More particularly, the invention relates to a magnetic recording medium having an overcoated layer greatly conducive to the improvement of durability of the medium, and a process for producing such magnetic recording medium.

In order to meet the growing request for high-density recording in recent years, efforts are being made for the development and practical use of so-called no-binder type magnetic recording medium made of a thin ferromagnetic metal film formed by vacuum evaporation, sputtering, ion-plating or other methods with no use of binder. The improvement of magnetic properties is of course an important requirement for realizing practical use of this type of magnetic recording medium, but the positive prevention of change in quality of the medium due to oxidation and other causes in use and the improvement of durability or the strength against frictional contact with the magnetic head are of equally as important factors for said purpose.

Proposals have been made for preventing change in quality of the medium and improving the durability thereof, for example a method in which a non-oxidizable metal such as Rh, Au, Pt, Pd, Cr, Al, Pd-B, Ce-Sn, Ag-Cu or the like is deposited as a protective layer on a thin ferromagnetic metal film (Japanese Patent Laid-Open Nos. 40505/78 and 73932/80).

Such method comprising formation of a metallic protective layer on a ferromagnetic thin film, however, was still unsatisfactory for providing the sufficient durability to the recording medium.

SUMMARY OF THE INVENTION

An object of this invention is to provide a magnetic recording medium which is phenomenally improved in its durability owing to the increased strength of adhesion of the protective layer to the ferromagnetic thin film, and a process for producing such a magnetic recording medium.

DETAILED DESCRIPTION OF THE PREFERRED EMBODIMENTS

The present invention relates to the production of a magnetic recording medium with high durability comprising forming a thin ferromagnetic metal film on a substrate by a vapor deposition method such as vacuum evaporation, sputtering or ion-plating, and further forming directly on said ferromagnetic film a protective layer by vapor deposition.

The term "directly" is used here to refer to such a condition that the interface between the ferromagnetic film and the protective layer thereon is free of obvious reaction deposit of the elements constituting the ferromagnetic film (exclusive of the reaction deposit of the elements constituting the protective layer) and contamination by foreign substances, and such "direct" lamination can be achieved by, for instance, forming a protective layer on said ferromagnetic thin film under the vacuum used when forming said ferromagnetic film.

The necessity of said direct formation of the protective layer on the ferromagnetic film is attributed to the following fact.

When the thin ferromagnetic metal film formed by such method is taken out into the air or it is left in the film forming apparatus for a long time, the surface of the film tends to collect and adsorb oil and water vapors which cause oxidation or contamination of the film surface, and when a protective layer is formed thereon, the adhesion between said ferromagnetic film and protective layer is reduced under the influence of said oxidized layer or adsorbed materials, resulting in a poor durability of the product. (For instance, when Si, and Si alloy and an Si oxide are deposited on a thin ferromagnetic metal film and their microscopic strength of adhesion is compared, it is found that the Si and Si alloy deposits show a far higher strength of adhesion than the Si oxide. This is considered ascribable to the fact that the force of bonding to Fe, Co, Ni, etc., is greatly reduced by the intervention of oxygen, nitrogen and other elements.)

When a ferromagnetic metal film is deposited with an overcoating (protective) layer immediately after formation of said film, the overcoated layer material can be deposited on said film while its surface is still in a clean and active state, so that the strength of adhesion between them is maximized and naturally the durability of the product is improved. In this case, no oxidized layer exists at the interface between the ferromagnetic magnetic film and the overcoated layer. In case the substrate is heated when forming the ferromagnetic metal film, it is desirable to keep the substrate heated until the formation of the overcoat layer is completed, because such continuous heating prevents adsorption of residual gases in the film forming chamber and makes it possible to maintain the film surface active. The substrate temperature is preferably maintained in the range of 50°–400° C. which is suited for maximizing the adhesion strength without causing deterioration of magnetic properties of the ferromagnetic metal film. In case the film surface was contaminated, it is recommended to clean the film surface by an appropriate method such as ionic sputtering before forming the overcoating layer.

The protective layer (overcoated layer) thickness is selected to meet the requirements that the desired protective effect is provided and that the magnetic record reading output is not reduced by spacing loss due to the gap between the magnetic recording medium surface and the magnetic head, and in view of this, the preferred protective layer thickness is in the range of 0.003–0.3 $\mu$m, more preferably 0.01–0.15 $\mu$m.

As the material for said protective layer, Si, Si-based alloys, Ge, Ge-based alloys, B and B compounds are preferred for the following reasons. "Si-based alloys" referred to herein mean the alloys containing Si in an amount of 50 atom % or more, preferably 66 atom % or more. The similar definition applies to "Ge-based alloys".

The protective layer is required to fulfill the following requirements: it is resistant to corrosion; it can protect the magnetic layer as desired; it has enough lubricity against frictional contact with the magnetic head; and it allows the minimized film thickness (1,000 Å or less) for arresting the reduction of electro-magnetic conversion efficiency. The surface of a ferromagnetic thin metal film formed on a non-magnetic substrate usually has microscopic undulations. The protective layer is required to adhere firmly on such microscopic undulations, and it is desirable that such microscopic undulations be flattened by forming the protective layer thereon. The size of microscopic undulations is maximized in a perpendicular magnetic film composed of perpendicularly oriented columnar crystallites. For instance, in the case of perpendicular magnetic films made from Co-based alloy films, there exist on their surfaces the undulations with a period of 200-500 Å and a depth of 50-200 Å. In the area of the surface where the interface of microscopic crystallites is exposed, there even exist the depressions with a size of atomic order (10 Å or less). The protective layer formed on a ferromagnetic metal film having such microscopic undulations is required to adhere firmly on such undulate film surface with the protective layer material getting down to every nook and corner of the undulations.

The experiments conducted by the present inventors showed that the use of Si, Si-based alloys, Ge, Ge-based alloys, B and B compounds as the protective layer material produces an especially excellent effect. This owes to the facts that the Si, Ge and B atoms are significantly small in size in comparison with the atoms such as Fe, Ni, Co, etc., constituting the ferromagnetic metal film and can easily make their way even into the microscopic depressions on the film surface, and that Si, Ge and B have a good affinity for the metal atoms and can firmly adhere to a magnetic film. Further, the Si, Ge and B type materials are dense and hard and can be worked into a smooth surface so that, in use for a magnetic recording medium, they prove especially excellent in wear resistance and lubricity for the magnetic head. Also, it is easy with these materials to form an amorphous-like layer on the surface of a magnetic film by sputtering or other means, and when a protective layer with a thickness on the order of 200-500 Å is formed with these materials on a magnetic film, such a protective layer shows a tendency to flatten the microscopic undulations on the magnetic film surface. Moreover, Si, Ge and B have excellent corrosion resistance, and when a lubricant composed of an organic material is used for the purpose of further improving the durability, Si, Ge and B show better affinity for the organic material than when using other metals for the protective layer.

Ge, Sn, C, Sb, Bi, B and the like can be used as alloying elements of Si alloys, and Si, Sn, C, Sb, Bi, B and the like can be used as alloying elements of Ge alloys. One typical advantage in use of an alloy is that by adding a small quantity of said alloy elements to pure Si or pure Ge, there can be obtained a protective layer with higher hardness and higher wear resistance owing to the solid solution hardening effect. Also, in the production of a metallized film, if pure Si or pure Ge is used, it is hard to carry out stable evaporation especially in film forming at a high speed above 5 A/S, but when alloying elements are added, evaporation is stabilized and a high-quality protective layer can be obtained in a high yield.

B compounds usable in this invention include $B_4C$, $B_4Si$, $B_6Si$ and the like. Mixtures of these compounds are also usable.

In this invention, use of amorphous material for the protective layer is desirable as such a material is found better suited for forming a homogeneous film, but crystalline material may be contained.

The present invention provides a magnetic recording medium having a protective film comprising two laminated filmy layers having different functions, and a process for producing such magnetic recording medium.

The roles of the protective film provided on a ferromagnetic film are (1) to prevent the change in quality of the ferromagnetic film due to oxidation, etc., of the film, (2) to prevent or minimize the wear of the latter film when it moves sliding along the magnetic head, and (3) to minimize the friction between the film and the magnetic head in sliding movement. According to the present invention, a protective film that can well perform said roles is provided characteristically by laminating two filmy layers differing in the roles they play. The first layer is composed of a material which is effective for preventing the change in quality of the ferromagnetic film and has excellent wear resistance and the second layer is composed of a material which produces little friction on sliding contact with the magnetic head. Preferred examples of the material used for the first layer are Si, Ge, B, alloys containing at least one of said elements as principal constituent, and compounds containing said elements as principal component, such as SiC, Si3N, B4Si, B4C and the like. These materials are usually hard and highly resistant to wear. They are also capable of forming a dense film free of pinholes and further provide a high strength of adhesion to the ferromagnetic film. As the material for the second layer, Sn, Pb, In, Se, Te, Cu, Ag, Au or alloys containing one of these elements as principal constituent are preferred. These materials are usually soft and can play the role of a lubricant as the film made of such material intervenes between the first layer made of hard material and the magnetic head also made of a hard material.

The thickness of the protective film of said structure should be properly selected from the range of 0.003-0.5 μm, preferably 0.01-0.2 μm, by taking into considerations the essential conditions that the selected thickness should be able to provide a sufficient protective effect and to inhibit the reduction of the magnetic record reading output caused by spacing loss due to the gap between the recording layer surface of the magnetic recording medium and the magnetic head. It is required that the sum of the thickness of the first layer and the thickness of the second layer falls within said range. In the case of the two-layer structured protective film, it is desirable that the first layer is 1.5 to 5 times greater in thickness than the second layer.

The ferromagnetic metal film in accordance with this invention is preferably formed from a Co-based alloy such as Co-Cr, Co-V, Co-Mo, Co-W, Co-Re, Co-O, Co-Cr-Rh, Co-Cr-Ru, Co-Ni-O, Co-Ni, Co-P, Co-B, Co-Si, Co-Y, Co-La, Co-Pr, Co-Ce, Co-Sm, Co-Mn, Co-Ni-P, Co-Ni-B, Co-Ni-Ag, Co-Ni Nd, Co-Ni-Ce, Co-Ni-Zn, Co-Ni-Cu, Co-Ni-Hg, Co-Ni-W, Co-Ni-Re, Co-Mn-P, Co-Zn-P and the like or an Fe-based alloy such as Fe-Co, Fe-Ni, Fe-Si, Fe-Rh, Fe-V and the like by making a film thereof by a vapor deposition method such as evaporation, sputtering, ion plating, etc. The thickness of the ferromagnetic metal film should be in the range of 0.03-5 μm, but a thickness in the range of 0.05-1 μm is preferred for realizing high-density magnetic recording.

As the substrate material for the ferromagnetic metal film, there can be used high polymeric materials such as polyimide, polycarbonate, polyvinylidene chloride, polyethylene terephthalate, polyethylene naphthalate, cellulose acetate, polyamide and the like, metallic materials such as aluminum, stainless steel, brass and the like, as well as glass and ceramic. A filmy layer made of other material may be provided between the substrate made of a material such as mentioned above and the ferromagnetic metal film. For example, an intermediate thin layer of Cr may be provided for increasing the strength of adhesion between the substrate and the ferromagnetic metal film or a thin layer of a soft magnetic material may be provided for improving the magnetic properties of the ferromagnetic metal film. The substrate may take the form of a disc, tape or drum.

The present invention is further described below by way of the Examples thereof.

EXAMPLE 1

Figure 1:
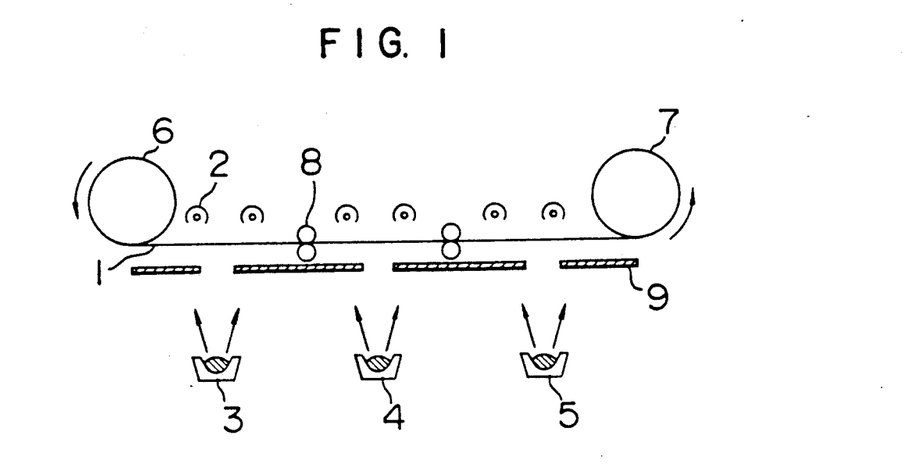
FIG. 1 is a side view illustrating schematically an example of construction of the apparatus used for carrying out the process for producing a magnetic recording medium in accordance with this invention.
Figure 2:
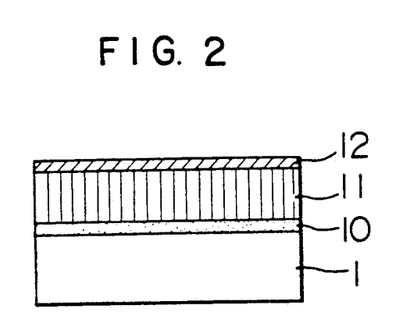
FIGS. 2, 3 and 4 are sectional views showing schematically the sectional structures of the samples of magnetic recording medium produced in accordance with this invention.

By using a polyimide film as substrate, a magnetic recording medium was produced by using a metallizing apparatus of a construction shown in FIG. 1. In a vacuum of $1 \times 10^{-6}$ Torr, Ge was evaporated from a deposition metal source 3 while heating the polyimide film substrate 1 to 200° C. by an infrared heater 2 to form a 300 Å thick Ge (10) layer on the substrate as shown in FIG. 2. Then Co-Cr alloy was evaporated from another deposition metal source 4 while keeping the substrate temperature at 150° C. to form a 3,500 Å thick Co-21 wt. % Cr ferromagnetic metal film (11). Further, at the same substrate temperature, Si was evaporated from still another deposition metal source 5 to form a 200 Å thick protective layer of Si (12), thereby producing a magnetic recording medium of a structure shown in FIG. 2. The 300 Å Ge deposit on the polyimide film is intended for improving the magnetic properties of the Co-Cr film and increasing the adhesion strength.

Samples of magnetic recording medium having a similar structure were produced under the same conditions as described above but by using Si-3 wt. % B, respectively, in Si-30 wt. % Sn, Si-25 wt. % Sb and Si-10 wt. % B, respectively, in place of Si. These samples of magnetic recording medium are referred to as sample group A.

As comparative samples, a batch of samples of magnetic recording medium were produced by following the same process as described above except that, after formation of the Co-Cr alloy film, the substrate temperature was lowered to room temperature, kept at this temperature for 10 hours and then again heated to 150° C. and the protective film was formed in this state. The thus produced samples are referred to as sample group B.

As another group of comparative samples, a batch of samples of magnetic recording medium were produced by following the same process as described above except that, after formation of the Co-Cr alloy film, the substrate temperature was lowered to room temperature, the metallizing apparatus was opened to expose the inside thereof to the air for 10 hours and then again evacuated to a vacuum of $1 \times 10^{-6}$ Torr, with the substrate being heated to 150° C., and the protective film was formed under this condition. These samples are referred to as sample group C.

There were also prepared the samples having no protective film as standard samples for each of said sample groups A, B and C.

A disc test piece was cut out from each of said samples and subjected to durability test in the following way: each sample disc was set on a disc turning device and turned continuously at a speed of 1.5 m/s in sliding contact with the magnetic head under a load of 10 g, and the number of turns which the samples could endure until they became flawed was counted. The results are shown in Table 1.

TABLE 1-1

| Producing conditions | Material of protective layer | | | |
|---|---|---|---|---|
| | None | Si | Si-3 wt % C | Si-10 wt % Ge |
| Group A | 860 (num. of turns) | 560 × 10³ (num. of turns) | 578 × 10³ (num. of turns) | 581 × 10³ (num. of turns) |
| Group B | 825 | 312 × 10³ | 300 × 10³ | 320 × 10³ |
| Group C | 820 | 15 × 10³ | 12 × 10³ | 16 × 10³ |

TABLE 1-2

| Producing conditions | Material of protective layer | | |
|---|---|---|---|
| | Si-30 wt % Sn | Si-25 wt % Sb | Si-10 wt % B |
| Group A | 365 × 10³ (num. of turns) | 326 × 10³ (num. of turns) | 592 × 10³ (num. of turns) |
| Group B | 205 × 10³ | 186 × 10³ | 340 × 10³ |
| Group C | 6.5 × 10³ | 5.2 × 10³ | 17 × 10³ |

As seen from Table 1, durability of the magnetic recording medium is greatly improved by providing a protective layer. Particularly, improvement of durability is conspicuous with group A and group B in which the ferromagnetic metal film and the protective layer were formed continuously in a vacuum, and especially excellent durability is seen with the samples of group A in which the continuous film formation was conducted while keeping the substrate at high temperature.

As appreciated from the foregoing results, it is the primary condition for improving the durability that the ferromagnetic metal film and the protective layer be formed continuously without exposing them to the air in the course of the forming process, and an even better result can be obtained when carrying out the continuous film formation while keeping the substrate at high temperature. When the effect of vacuum was examined by a similar test on the combinations of Co-Cr alloy film and Si or Si alloy protective layer described in this Example, there was seen a tendency that the strength of adhesion between said Co-Cr alloy film and protective layer lowers to deteriorate the durability when the degree of vacuum becomes worse than $5 \times 10^{-5}$ Torr. In this case, an oxidizing layer existed at the interface between the Co-Cr alloy film and the protective layer. Also, as a result of examination of the effect of substrate temperature on durability during the period from completion of formation of the Co-Cr alloy film till the time when formation of the protective film was started, it was found that when the lowest substrate temperature becomes lower than 50° C., the film surface tends to adsorb residual gases in the vacuum and resultantly the durability is deteriorated in comparison with the samples in which the protective film was formed by heating the substrate to a temperature above 50° C.

On the other hand, a too high substrate temperature causes a change in quality of the polyimide substrate, so that the substrate temperature should not exceed 400° C.

In a depthwise compositional analysis of the samples of groups A, B and C having a protective film by Auger electron spectroscopy, the presence of an oxidizing layer at the interface between the ferromagnetic metal film and the protective film was distinctly seen in the samples of group C, but no evident existence of an oxidizing layer was admitted in the samples of groups A and B.

The same effect was seen in case of using Co-V, Co-Mo, Co-W, Co-Re, Co-Ni, Co-Cr-Rh, Co-Cr-Ru, Co-Si, Co-Y, Co-La, Co-Pr, Co-Ce, Co-Sm, Co-Mn, Fe-Co, Fe-Ni, Fe-Si, Fe-Rh and Fe-V ferromagnetic metal films in place of Co-Cr ferromagnetic metal film, which indicates that the durability is markedly improved by forming a protective layer of Si or an Si-based alloy successively to the formation of the ferromagnetic metal film.

Even better durability could be obtained by additionally applying a high polymeric lubricant to the surface of the magnetic recording medium.

EXAMPLE 2

By using a disc-shaped oxidized aluminum substrate having a diameter of 100 mm and a thickness of 2 mm, a magnetic recording medium was produced in the following procedure by using a continuous sputtering apparatus. The sample chamber of the sputtering apparatus was evacuated to $5 \times 10^{-7}$ Torr, followed by the introduction of Ar gas of $3 \times 10^{-3}$ Torr, and a Co-80 wt. % Zr-9.5 wt. % Mo alloy was sputter deposited at a high frequency output of 4 W/cm$^2$ and a substrate temperature of 100° C. to form a 5,000 Å thick film. Then the sputter target was replaced with a Co-20.0 wt. % Cr alloy. During this operation, the interior of the sample chamber was maintained under an Ar atmosphere of $3 \times 10^{-3}$ Torr and the substrate temperature was kept at 100° C. A Co-Cr alloy film was also sputter deposited to a thickness of 2,000 Å in the similar way. Further, the sputter target was changed with Si and a 300 Å thick protective layer of Si was formed under the same sputtering conditions.

Similar samples of magnetic recording medium were produced by following the same process as described above except that Si-2 wt. % C, Si-15 wt. % B, Si-5 wt. % Ge, Si-10 wt. % Sn, Si-40 wt. % Sb, Si-5 wt. % Mn and Si-3 wt. % Cr were used in place of Si as sputter target. This group of samples is referred to as group D.

As comparative samples, a batch of similar magnetic recording media were produced under the same film-forming conditions as described above except that the substrate temperature was lowered to room temperature after forming the Co-Cr alloy film, said film being maintained in an Ar atmosphere of $3 \times 10^{-3}$ Torr for 24 hours, and then the protective layer was formed by heating the substrate to 150° C. These samples are referred to as sample group E.

As still another comparative samples, similar magnetic recording media were produced by following the same process as described above except that the substrate temperature was lowered to room temperature after forming the Co-Cr alloy film, then said film was removed from the apparatus and set in a different sputtering apparatus, said apparatus being evacuated to $6 \times 10^{-7}$ Torr, followed by the introduction of Ar gas of $2 \times 10^{-3}$ Torr, and the 300 Å protective layers made of Si and various Si alloys were formed under the condition of 5 W/cm$^2$. These comparative samples are referred to as sample group F.

When producing the samples of groups D, E and F, there were concurrently produced the samples with no protective layer, one such sample for each group.

The thus obtained samples were subjected to the same durability test as conducted in Example 1. The results are shown in Table 2.

TABLE 2-1

| Producing conditions | Material of protective layer | | | | |
|---|---|---|---|---|---|
| | None | Si | Si-2 wt % C | Si-15 wt % B | Si-5 wt % Ge |
| Group D | $\times 10^3$ (num. of 1.2 turns) | $\times 10^6$ (num. of 6.3 turns) | $\times 10^6$ (num. of 8.9 turns) | $\times 10^6$ (num. of 8.2 turns) | $\times 10^6$ (num. of 5.1 turns) |
| Group E | $1.1 \times 10^3$ | $1.2 \times 10^6$ | $2.1 \times 10^6$ | $1.9 \times 10^6$ | $1.6 \times 10^6$ |
| Group F | $1.3 \times 10^3$ | $2.0 \times 10^3$ | $4.3 \times 10^3$ | $3.6 \times 10^3$ | $2.1 \times 10^3$ |

TABLE 2-2

| Producing conditions | Material of protective layer | | | |
|---|---|---|---|---|
| | Si-10 wt % Sn | Si-40 wt % Sb | Si-5 wt % Mn | Si-3 wt % Cr |
| Group D | $\times 10^6$ (num. of 4.1 turns) | $\times 10^6$ (num. of 3.2 turns) | $\times 10^6$ (num. of 6.1 turns) | $\times 10^6$ (num. of 2.8 turns) |
| Group E | $1.3 \times 10^6$ | $1.0 \times 10^6$ | $2 \times 10^6$ | $1.2 \times 10^6$ |
| Group F | $1.8 \times 10^3$ | $1.3 \times 10^3$ | $1.6 \times 10^3$ | $1.1 \times 10^3$ |

As seen from Table 2, the durability is greatly improved by providing a protective layer made of Si or an Si alloy. Particularly, a noted improvement of durability is seen in groups D and E in which the ferromagnetic metal film and the protective film were formed continuously. It is further noted that an especially high durability is shown by the samples of group D in which the continuous film formation was conducted while keeping the substrate at high temperature.

As a result of a depthwise compositional analysis of the samples of groups D, E and F with a protective layer by Auger electron spectroscopy, the presence of an oxidized layer was not distinctly seen at the interface between the Co-Cr alloy film and the protective film in groups D and E, but a large amount of oxygen was detected at the interface and the presence of an oxidized layer was evident in the samples of group F.

This phenomenon may be accounted for as follows: maintenance of the substrate at a high temperature could inhibit the impurities such as oil vapor in the sample chamber from being adsorbed on the surface of the ferromagnetic metal film, and this made for the increased strength of adhesion between the ferromagnetic metal film and the protective layer. However, when the substrate temperature exceeded 400° C., there arose the problems such as deterioration of the magnetic properties of the ferromagnetic metal film and the reaction between the ferromagnetic metal film and the protective layer material. Therefore, it is necessary to keep the substrate temperature below 400° C.

The similar effect could be obtained when polyimide, polyethylene terephthalate, polycarbonate, polychlorovinylidene, glass and brass were used as substrate in place of Al.

Also, in case Co-V, Co-Mo, Co-Re, Co-Cr-Rh, Co Cr-Ru, Co-Ni-O, Co-Ni, Co-P, Co-B, Co-Si, Co-Ni-P, Co-Ni-B, Co-Ni-Ag, Co-Ni-Nd, Co-Ni-Ce, Co-Ni-Zn, Co-Ni-Cu, Co-Ni-Hg, Co-Ni-W, Co-Ni-Re, Co-Mn-P, Co-Zn-P, Fe-Co, Fe-Ni, Fe-Si, Fe-Rh and Fe-V alloy films were used in place of Co-Cr on the Al substrate, a marked improvement of durability was provided by depositing an Si or Si alloy protective layer successively to the formation of the ferromagnetic metal film.

The overcoating layer could be determined to be amorphous by X-ray diffraction in all the samples.

EXAMPLE 3

A magnetic recording medium having a protective layer of Ge was produced in the same way as in Example 1 except that Ge was evaporated instead of Si from the depositing metal source 5. Also, by following the process of Example 1, there were produced samples of magnetic recording medium having the similar structure by using Ge-3 wt. % C, Ge-10 wt. % Si, Ge-30 wt. % Sn, Ge-25 wt. % Sb and Ge-10 wt. % B as protective layer material in place of Ge. The samples produced under these producing conditions are referred to as group G.

As comparative samples, a batch of similar samples of magnetic recording medium were produced by following the same procedure as with group B in Example 1. These samples are referred to as group H. As another comparative samples, there were produced the samples of magnetic recording medium according to the procedure of group C in Example 1. These samples are referred to as group I. The samples having no protective film were further prepared as standard samples in each of said groups G, H and I.

Each of the thus obtained samples was subjected to the same durability test as in Example 1. The results are shown in Table 3.

TABLE 3-1

| Producing conditions | Material of overcoating layer ||||
|---|---|---|---|---|
| | None | Ge | Ge-3 wt % C | Ge-10 wt % Si |
| Group G | 860 (num. of turns) | 180 × $10^3$ (num. of turns) | 230 × $10^3$ (num. of turns) | 480 × $10^3$ (num. of turns) |
| Group H | 825 | 150 × $10^3$ | 195 × $10^3$ | 250 × $10^3$ |
| Group I | 820 | 2 × $10^3$ | 3 × $10^3$ | 9 × $10^3$ |

TABLE 3-2

| Producing conditions | Material of overcoating layer |||
|---|---|---|---|
| | Ge-30 wt % Sn | Ge-25 wt % Sb | Ge-10 wt % B |
| Group G | 195 × $10^3$ (num. of turns) | 200 × $10^3$ (num. of turns) | 410 × $10^3$ (num. of turns) |
| Group H | 180 × $10^3$ | 185 × $10^3$ | 230 × $10^3$ |
| Group I | 3 × $10^3$ | 5 × $10^3$ | 8 × $10^3$ |

As seen from Table 3, the durability of the magnetic recording medium is appreciably as Example 1 by providing a protective layer. The improvement is conspicuous in groups G and H in which the ferromagnetic metal film and the protective layer were formed continuously in vacuum, an especially high improvement of durability is provided on the samples of group G in which the continuous film formation was performed while maintaining the substrate at high temperature. When the effect of the degree of vacuum on durability was examined by a similar test on the combinations of Co-Cr alloy film and Ge or Ge alloy protective layer used in this Example, a tendency was seen that the strength of adhesion between Co-Cr alloy film and protective layer lowers to deteriorate the durability when the vacuum pressure becomes more than $5 \times 10^{-5}$ Torr. An Auger electron spectroscopic analysis of the interface between Co-Cr alloy film and protective layer in said magnetic films confirmed the presence of an oxidized layer near the interface in the magnetic films produced in a bad vacuum. Also, in an examination of the effect of substrate temperature on durability during the period from the formation of Co-Cr alloy film till the time when the formation of the protective layer is started, the fact was disclosed that when the lowest substrate temperature drops below 50° C., residual gases in the vacuum tend to be adsorbed on the film surface to adversely affect the durablity.

The similar tendency was observed when other ferromagnetic metal films were used in place of Co-Cr film in the safe process as Example 1.

EXAMPLE 4

A magnetic recording medium having a protective layer of Ge was produced under the same conditions as in Example 2 except that Ge sputter target was used instead of Si, the substrate temperature being set at 150° C., and a 200 Å thick protective layer was formed.

Similar samples of magnetic recording medium were produced under the same conditions as described above except for use of the sputter targets of Ge-2 wt. % C, Ge-15 wt %B, Ge-15 wt. % Si, Ge-10 wt. % Sn, Ge-40 wt. % Sb, Ge-5 wt. % Mn and Ge-3 wt. % Cr in place of Ge. This group of samples is referred to as sample group J.

Comparative samples of magnetic recording medium were produced by carrying out the film-forming process under the same conditions as with group E in Example 2. The thickness of the protective layer in these samples was 200 Å. These samples are referred to as group K.

Another batch of comparative samples were produced by carrying out the film-forming process under the same conditions as with group F in Example 2. The protective layer thickness was 200 Å. This group of samples is referred to as sample group L.

When producing said samples of groups J, K and L, there were also produced the samples having no protective layer, one such sample for each group.

The durability test of Example 1 was conducted on said samples to obtain the results shown in Table 4.

TABLE 4-1

| Producing conditions | Material of protective layer | | | | |
|---|---|---|---|---|---|
| | None | Ge | Ge-2 wt % C | Ge-15 wt % B | Ge-15 wt % Si |
| Group J | $1.2 \times 10^3$ (num. of turns) | $4.2 \times 10^5$ (num. of turns) | $6.1 \times 10^5$ (num. of turns) | $6.2 \times 10^5$ (num. of turns) | $5.2 \times 10^5$ (num. of turns) |
| Group K | $1.1 \times 10^3$ | $1.0 \times 10^5$ | $2.0 \times 10^5$ | $1.9 \times 10^5$ | $1.7 \times 10^5$ |
| Group L | $1.3 \times 10^3$ | $1.6 \times 10^3$ | $2.8 \times 10^3$ | $2.6 \times 10^3$ | $2.0 \times 10^3$ |

TABLE 4-2

| Producing conditions | Material of protective layer | | | |
|---|---|---|---|---|
| | Ge-10 wt % Sn | Ge-40 wt % Sb | Ge-5 wt % Mn | Ge-3 wt % Cr |
| Group J | $4.1 \times 10^5$ (num. of turns) | $3.1 \times 10^5$ (num. of turns) | $5.1 \times 10^5$ (num. of turns) | $2.7 \times 10^5$ (num. of turns) |
| Group K | $1.2 \times 10^5$ | $1.0 \times 10^5$ | $1.8 \times 10^5$ | $1.2 \times 10^5$ |
| Group L | $1.7 \times 10^3$ | $1.3 \times 10^3$ | $1.9 \times 10^3$ | $1.0 \times 10^3$ |

As seen from Table 4, the durability of the magnetic recording medium is greatly improved by providing a protective layer made of Ge or a Ge alloy as in Example 2. The improvement is particularly conspicuous in the samples of group J in which the ferromagnetic metal film and the protective layer were formed continuously. It is also seen that the samples of group J in which the continuous film formation was carried out while keeping a high substrate temperature have especially excellent durability.

Auger electron spectroscopy of the interface between the ferromagnetic metal film and the protective layer confirmed the presence of an oxidized layer or a hydrocarbon adsorbed layer a the interface in the samples of group L while no evident formation of such layer was seen in the samples of groups J and K.

The similar effect was obtained when other substrate materials were used in place of Al in the same way as in Example 2.

Also, in case other ferromagnetic metal films were used in place of Co-Cr film on the Al substrate in the similar way to Example 2, a marked improvement of durability could be attained by depositing a protective layer of Ge or a Ge alloy successively to the formation of the ferromagnetic metal film.

The protective layer was found to be amorphous by X-ray diffraction in all the samples.

EXAMPLE ≡

Figure 3:
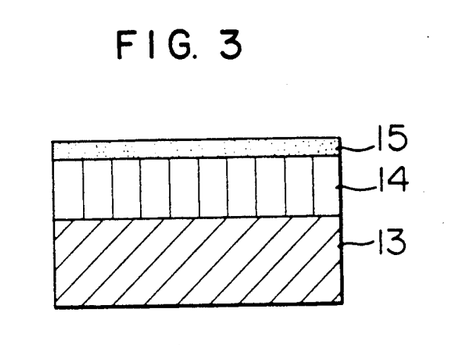

By using a polyimide film as substrate (13), a magnetic recording medium of the structure shown in FIG. 3 was produced by sputtering. After evacuating the sample chamber of the sputtering apparatus to $5 \times 10^{-5}$ Pa, Ar gas of 0.3 Pa was introduced into the chamber and a Co-20 wt. % Cr alloy was sputter deposited and a 0.3 μm or an alloy principally made of Si, Ge, or B under the conditions of: high frequency output = 4 W/cm²; substrate temperature = 100° C. Then the sputter target was changed to B while maintaining the vacuum of the sample chamber and a 200 Å thick protective layer (15) was formed under the safe conditions as described above.

In the same way as described above but by using B₄C, B₄Si and B₆Si targets in place of B target, there were produced samples of magnetic recording medium having the protective layers made of said materials.

Also produced as comparative samples were the samples having the similar structure with no protective layer or with a protective layer of Cr.

These samples were subjected to the same durability test as conducted in Example 1.

A corrosion resistance test was also conducted by placing the sample in an environment of 60° C. and 90% RH for one month and then examining the sample surface by a optical microscope. The results are shown comprehensively in Table 5. In the corrosion resistance test results, ○ indicates that no trace of corrosion was seen in the ferromagnetic metal film, Δ indicates that a discoloration was seen under observation with the optical microscope, and X indicates that a discoloration was clearly seen with the naked eye.

TABLE 5

| Test | Protective layer | | | | | |
|---|---|---|---|---|---|---|
| | None | Cr 200 Å | B 200 Å | B₄C 200 Å | B₄Si 200 Å | B₆Si 200 Å |
| Durability | 820 | $10 \times 10^3$ | $230 \times 10^3$ | $210 \times 10^3$ | $280 \times 10^3$ | $250 \times 10^3$ |
| Corrosion resistance | X | Δ | ○ | ○ | ○ | ○ |

It was thus found that the magnetic recording medium having a protective film of B or a B-based compound has excellent durability and corrosion resistance. High corrosion resistance is also provided by use of Si, Si alloys, Ge and Ge alloys mentioned above as protective layer material.

Examination by a scanning electron microscope of the surfaces of the samples having a 200 Å thick protective film of B or a B-based material and the samples having no protective film showed that the surfaces of the samples having a protective film were less in undulations and more smooth than the surfaces of the samples having no protective film. It was also noted that the durability enhanced proportionally to the thickness of the protective film, but the electromagnetic conversion efficiency deteriorated as the distance between the magnetic recording medium and the head increased. The range of protective film thickness which caused no deterioration of electromagnetic conversion efficiency and could maintain high durability was 100–800 Å, more preferably 150–300 Å.

In this Example, a protective film of B or a B-type material was provided successively to the formation of the ferromagnetic metal film by using the same apparatus, and it was experimentally ascertained that, by so doing, the adhesive strength of the protective film is increased.

When Co-based alloys other than Co-Cr, Fe-based alloys and Ni-based alloys were used as magnetic film material, durability and corrosion resistance were also improved by providing a protective film made of any of B, $B_4C$, $B_4Si$ and $B_6Si$. The similar effect was also seen when using $B_4Si_x C_{1-x}$, mixture of $B_4C$ and $B_4Si$, and the like.

The foregoing discussion pertains to the case where both magnetic film and protective film were formed by sputtering, but the similar effect was observed when they were formed by vacuum evaporation. It was also found that both durability and corrosion resistance improve when using Al, glass and the like as the non-magnetic substrate.

EXAMPLE 6

Figure 4:
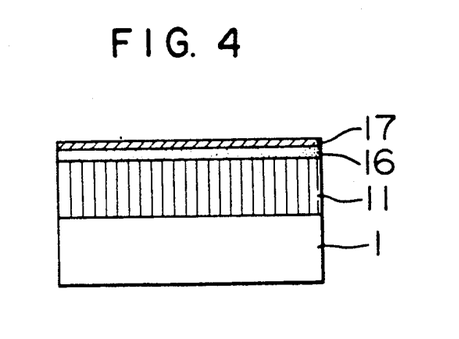

By using a polyimide film as substrate, a magnetic recording medium having a protective film was produced by using a depositing apparatus illustrated in FIG. 1. A Co-Cr alloy was evaporated from a depositing material source 3 while heating the polyimide film substrate 1 to 180° C. by an infrared heater 2 in a vacuum of $1 \times 10^{-6}$ Torr to form a 2,000 Å thick Co-20 wt. % Cr ferromagnetic film (11), as shown in FIG. 4. Then Si was evaporated from another depositing material source 4 while maintaining said substrate temperature to form a 200 Å thick first layer of protective film 16, and successively Sn was evaporated from the source 5 to form a 100 Å thick second layer of protective film 17, thereby producing a magnetic recording medium illustrated in FIG. 4.

In the same way but by using Pb, In, Se, Te, Cu, Ag, Au, Sn-30 wt. % Bi, In-10 wt. % Bi, Se-30 wt. % Te and Au-5 wt. % Al in place of S, there were produced the samples of magnetic recording medium of the same structure.

Also, the samples made by depositing Co-Cr alloy alone and having no protective film and the samples having the first Si layer alone as protective film were prepared as comparative samples.

A disc test piece wa cut out from each of said samples and subjected to a durability test in the following way: the test piece was set on a disc turning device and turned continuously at a speed of 1 m/s in sliding contact with a 10 g loaded head, and the number of turns which the test piece could endure until it became damaged was counted. The results are shown in Table 6.

TABLE 6

| 1st layer of protective film | None | Si | Si | Si | Si | Si | Si |
|---|---|---|---|---|---|---|---|
| 2nd layer of protective film | None | None | Sn | Pb | In | Se | Te |
| Number of turns | 930 | $5 \times 10^3$ | $8 \times 10^4$ | $6 \times 10^4$ | $9 \times 10^4$ | $3 \times 10^4$ | $2 \times 10^4$ |
| 1st layer of protective film | Si | Si | Si | Si | Si | Si | Si |
| 2nd layer of protective film | Cu | Ag | Au | Sn-30 wt % Pb | In-10 wt % Bi | Se-30 wt % Te | Au-5 wt % Al |
| Number of turns | $1 \times 10^4$ | $2 \times 10^4$ | $1.5 \times 10^4$ | $7 \times 10^4$ | $3 \times 10^4$ | $9 \times 10^4$ | $5 \times 10^4$ |

As seen from Table 6, it was ascertained that the two-layer structure of the protective film could greatly improve the durability of the magnetic recording medium. Also, in an environmental resistance test conducted on the samples of magnetic recording medium having a two-layer protective film by placing them in an environment of 65° C. and 95% RH for $10^4$ hours, no change of quality took place in the Co-Cr ferromagnetic film of each sample tested, indicating very excellent corrosion resistance of the samples.

EXAMPLE 7

A batch of samples were produced in the same way as Example 6 except for use of Ge in place of Si as the first-layer material of the protective film, and these samples were subjected to the same durability test as conducted in Example 6. In the case of the samples having no protective film and the samples having a single Ge layer alone as protective film, the number of turns which the samples could endure was less than $10^3$, while in case a second layer was provided on the first layer to form a two-layer protective film, the samples with any second-layer material could endure more than $10^4$ turns.

EXAMPLE 8

A batch of samples were produced by following the same process as Example 6 except for use of Si-30 wt. % Ge in place of Si as the first-layer material of the protective film, and these samples were subjected to the same durability test. In the case of the samples having no protective film and the samples having the first layer alone as protective film, the number of turns that the samples could endure was less than $10^3$, while the sample having a two-layer protective film, with any of the second-layer materials tested, could endure more than $10^4$ turns.

EXAMPLE 9

A magnetic recording medium was produced by providing a ferromagnetic film consisting of a 0.5 μm thick permalloy film and an overlying 0.15 μm thick Co20.5 wt. % Cr film on a disc-shaped oxidized aluminum substrate of 100 mm in diameter and 2 mm in thickness, and a protective film was formed on said magnetic recording medium in the following procedure: said recording medium was placed in a continuous sputtering apparatus, and a 200 Å thick layer of B was formed as the first layer of the protective film under the conditions of 4 W/cm$^2$ high frequency output and 120° C. substrate temperature and then a 100 Å thick layer of Sn was formed thereon as the second layer under the same conditions.

Other samples having the similar structure were produced under the same conditions by using SiC, Si3N, B4C, B4Si, Si-5 wt. % B and B-3 wt. % C in place of B as the first layer. As comparative samples, there were prepared the samples having no protective film and the samples having a 100 Å thick Sn layer alone as protective film on the magnetic film. These were subjected to the same durability test as conducted in Example 1. The test results are shown in Table 7.

TABLE 7

| 1st layer of protective film | None | None | B | SiC | Si$_3$N$_4$ |
|---|---|---|---|---|---|
| 2nd layer of protective film | None | Sn | Sn | Sn | Sn |
| Number of turns | 465 | 920 | $3 \times 10^5$ | $2 \times 10^5$ | $1 \times 10^5$ |

| 1st layer of protective film | B$_4$C | B$_4$Si | Si-5 wt % B | B-3 wt % C |
|---|---|---|---|---|
| 2nd layer of protective film | Sn | Sn | Sn | Sn |
| Number of turns | $2 \times 10^5$ | $1 \times 10^5$ | $0.9 \times 10^5$ | $2.5 \times 10^5$ |

What is claimed is:

1. A magnetic recording medium comprising a substrate, a ferromagnetic thin film formed on substrate, a protective film formed directly on the ferromagnetic thin film, and a lubricant layer made of an organic material on said protective film, said ferromagnetic thin film and said protective film being formed continuously without said ferromagnetic thin film and said protective film to air and while maintaining said ferromagnetic thin film and said protective film in a vacuum, said protective film having two layers, the first layer being made of the element Si, Ge or B, a compound of Si, Ge or B, or an alloy principally made of Si, Ge, or B and the second layer being made of the element Sn, Pb, In, Se, Te, Cu, Ag or Au, a Sn-based alloy, a Te-based alloy, a Cu-based alloy, an Ag-based alloy or an Au-based alloy.

2. A magnetic recording medium comprising a substrate, a ferromagnetic thin film formed on the substrate, and a protective film formed on the ferromagnetic thin film, an interface of said ferromagnetic thin film and said protective film being free of a reaction deposit of elements constituting said ferromagnetic thin film, exclusive of reaction deposit of elements constituting said protective film, and contamination by foreign substances, said ferromagnetic thin film being made of a material selected from the group consisting of Co-based alloys, Fe-based alloys and Ni-based alloys and said protective film being made of the element Si, the element Ge, the element B, an alloy principally made of Si, or Ge, or a B compound selected from the group consisting of B$_4$Si, B$_6$Si, and a mixture B$_4$C and of B$_4$Si.

3. A magnetic recording medium according to claim 2, wherein said protective film is made of an Si-based alloy.

4. A magnetic recording medium according to claim 2 wherein said protective film is made of a Ge-based alloy.

5. A magnetic recording medium according to claim 2 wherein said ferromagnetic thin film is made of a Co-Cr alloy.

6. A magnetic recording medium according to claim 2, further comprising a lubricant layer made of an organic material on said protective film.

7. A magnetic recording medium according to claim 2, wherein the protective film is made of an amorphous material.

8. A magnetic recording medium according to claim 2, wherein said protective film has a thickness in the range of 0.003 to 0.3 μm.

9. A magnetic recording medium according to claim 2, wherein said protective film has a thickness in the range of 0.01 to 0.15 μm.

10. A magnetic recording medium according to claim 2, wherein said protective film is made of a mixture of B$_4$C and B$_4$Si.

11. A magnetic recording medium according to claim 2, wherein said protective film is made of Si.

12. A magnetic recording medium according to claim 2, wherein said protective film is made of Ge.

13. A magnetic recording medium comprising a substrate, a ferromagnetic thin film made of a Co-based alloy, a Fe-based alloy or a Ni-based alloy formed on the substrate, and a protective film formed on the ferromagnetic thin film, an interface of said ferromagnetic thin film and said protective film being free of a reaction deposit of elements constituting said ferromagnetic thin film, exclusive of reaction deposit of elements constituting said protective film, and contamination by foreign substances, wherein said protective film comprises two layers, a first layer of which is made of Si, Ge or B, a compound of Si, Ge or B, or an alloy principally made of Si, Ge, or B, and a second layer which is made of Sn, Pb, In, Se, Te, Cu, Ag or Au, or a Sn-based alloy, a Pb-based alloy, an In-based alloy, a Se-based alloy, a Te-based alloy, a Cu-based alloy, an Ag-based alloy or an Au-based alloy.

14. A magnetic recording medium according to claim 13, wherein said protective film has a thickness in the range of 0.003 to 0.5 μm.

15. A magnetic recording medium according to claim 14, wherein said first layer has a thickness 1.5 to 5 times greater than a thickness of said second layer.

16. A magnetic recording medium according to claim 13, wherein said protective film has a thickness in the range of 0.01 to 0.2 μm.

17. A magnetic recording medium according to claim 16, wherein said first layer has a thickness 1.5 to 5 times greater than a thickness of said second layer.

18. A magnetic recording medium according to claim 13, wherein said first layer is made of Si.

19. A magnetic recording medium according to claim 13, wherein said first layer is made of an Si-based alloy.

20. A magnetic recording medium according to claim 13, wherein said first layer is made of Ge.

21. A magnetic recording medium according to claim 13, wherein said first layer is made of a Ge-based alloy.

22. A magnetic recording medium according to claim 13, wherein said first layer is made of at least one material selected from the group consisting of B, $B_4C$, $B_4Si$ and $B_6Si$.

23. A magnetic recording medium according to claim 13, wherein said ferromagnetic thin film is made of a Co-Cr alloy.

24. A magnetic recording medium according to claim 13, further comprising a lubricant layer made of an organic material on said protective film.

25. A magnetic recording medium produced by a process comprising forming a ferromagnetic thin film on a substrate while maintaining said substrate under a vacuum atmosphere, and forming a protective film on said ferromagnetic thin film while maintaining said substrate and ferromagnetic thin film under said vacuum atmosphere, said protective film being formed directly on said ferromagnetic thin film and the interface of said ferromagnetic thin film and said protective film being free from contamination, wherein said protective film is made of a material selected from the group consisting of the element Si, the element Ge, the element B, an alloy principally made of Si, or Ge $B_4Si$, $B_6Si$ and a mixture of $B_4C$ and $B_4Si$.

26. A magnetic recording medium according to claim 25, wherein said substrate is maintained at a temperature in the range of 50° C. to 400° C. during the steps of from forming said ferromagnetic thin film and forming said protective film and between said steps of forming said ferromagnetic thin film and forming said protective film.

27. A magnetic recording medium according to claim 26, wherein said step of forming said ferromagnetic thin film and said step of forming said protective film are accomplished by a vacuum evaporation method in a vacuum of $5 \times 10^{-5}$ Torr or below or by a sputtering method.

28. A magnetic recording medium according to claim 25, wherein said protective film is made of an alloy containing at least 50 atomic % Si and further containing at least one element selected from the group consisting of Ge, Sn, C, Sb, Bi and B.

29. A magnetic recording medium according to claim 25, wherein said protective film is made of an alloy containing at least 50 atomic % Ge and further containing at least one element selected from the group consisting of Si, Sn, C, Sb, Bi and B.

30. A magnetic recording medium according to claim 25, wherein said protective film has a thickness in the range of 0.003 to 0.5 $\mu$m.

31. A magnetic recording medium according to claim 25, wherein said protective film has a thickness in the range of 0.01 to 0.2 $\mu$m.

32. A magnetic recording medium produced by a process comprising forming a ferromagnetic thin film on a substrate while maintaining said substrate under a vacuum atmosphere, and forming a protective film on said ferromagnetic thin film while maintaining said substrate and ferromagnetic thin film under said vacuum atmosphere, said protective film being formed directly on said ferromagnetic thin film and the interface of said ferromagnetic thin film and said protective film being free from contamination, wherein said protective film comprises two layers, a first layer of which is made of Si, Ge or B, a compound of Si, Ge or B, or an alloy principally made of Si, Ge or B and a second layer which is made of Sn, Pb, In, Se, Te, Cu, Ag or Au, or a Sn-based alloy, a Pb-based alloy, an In-based alloy, a Se-based alloy, a Te-based alloy, a Cu-based alloy, an Ag-based alloy or an Au-based alloy.

33. A magnetic recording medium according to claim 32, wherein said protective film has a thickness in the range of 0.003 to 0.5 $\mu$m, and said first layer has a thickness which is 1.5 to 5 times greater than a thickness of said second layer.

34. A magnetic recording medium comprising a substrate, a ferromagnetic thin film formed on the substrate, and a protective film formed on the ferromagnetic thin film, an interface of said ferromagnetic thin film and said protective film being free of a reaction deposit of elements constituting said ferromagnetic thin film, exclusive of reaction deposit of elements constituting said protective film, and contamination by foreign substances, said ferromagnetic thin film being made of a material selected from the group consisting of Co-based alloys, Fe-based alloys and Ni-based alloys and said protective film being made of $B_4Si$.

35. A magnetic recording medium comprising a substrate, a ferromagnetic thin film formed on the substrate, and a protective film formed on the ferromagnetic thin film, an interface of said ferromagnetic thin film and said protective film being free of a reaction deposit of elements constituting said ferromagnetic thin film, exclusive of reaction deposit of elements constituting said protective film and contamination by foreign substances, said ferromagnetic thin film being made of a material selected from the group consisting of Co-based alloys, Fe-based alloys and Ni-based alloys and said protective film being made of $B_6Si$.

36. A magnetic recording medium comprising a substrate, a ferromagnetic thin formed on the substrate, and a protective film formed on the ferromagnetic thin film, an interface of said ferromagnetic thin film and said protective film being free of a reaction deposit of elements constituting said ferromagnetic thin film, exclusive of reaction deposit of elements constituting said protective film, and contamination by foreign substances, said ferromagnetic thin film being made of a material selected from the group consisting of Co-based alloys, Fe-based alloys and Ni-based alloys and said protective film being made of the element B.

37. A magnetic recording medium comprising a substrate, a ferromagnetic thin film formed on the substrate, and a protective film formed on the ferromagnetic thin film and said protective film being free of a reaction deposit of elements constituting said ferromagnetic thin film, exclusive of reaction deposit of elements constituting said protective film, and contamination by foreign substances, said ferromagnetic thin film being made of a material selected from the group consisting of Co-based alloys, Fe-based alloys and Ni-based alloys and said protective film being made of an alloy of Si and B or an alloy of Ge and B.

* * * * *